Figure 1:
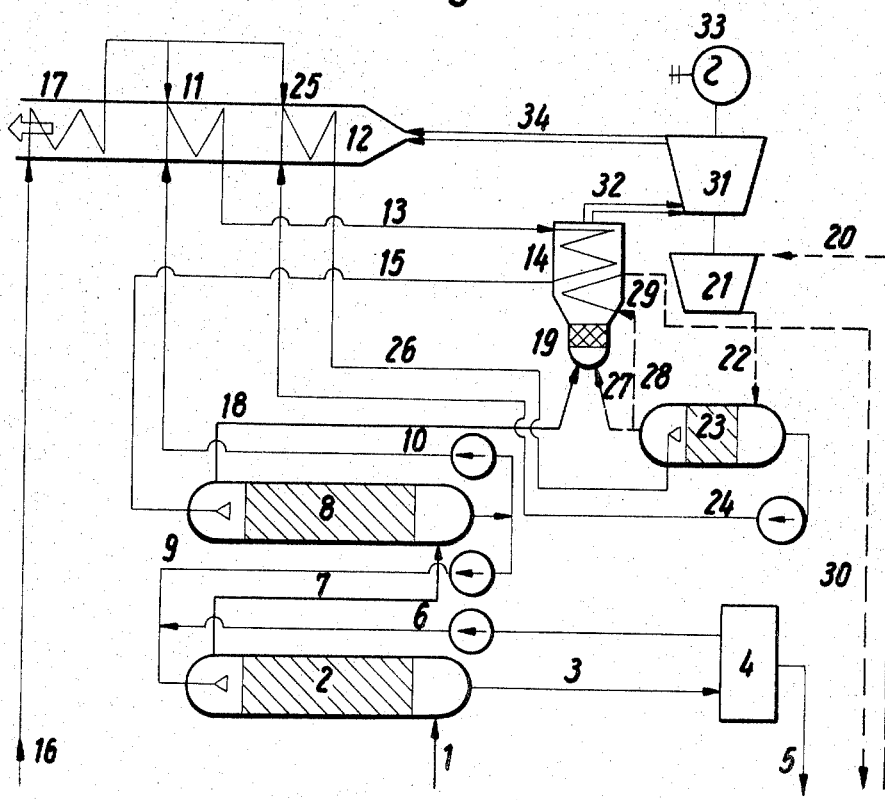

United States Patent [19]
Rudolph et al.

[11] 3,731,485
[45] May 8, 1973

[54] OPEN-CYCLE GAS TURBINE PLANT

[75] Inventors: Paul Rudolph, Bad Homburg; Ernst Kapp, Frankfurt am Main, both of Germany

[73] Assignee: Metallgesellschaft Aktiengesellschaft, Frankfurt am Main, Germany

[22] Filed: Feb. 1, 1971

[21] Appl. No.: 111,349

[30] Foreign Application Priority Data

Feb. 7, 1970 Germany...............P 20 05 656.1

[52] U.S. Cl. ...............60/39.05, 60/39.12, 60/39.53
[51] Int. Cl. ..................................................F02g 3/00
[58] Field of Search.........................60/39.05, 39.53, 60/39.12

[56] References Cited

UNITED STATES PATENTS

| | | | |
|---|---|---|---|
| 2,869,324 | 1/1959 | Foote | 60/39.05 |
| 2,115,338 | 4/1938 | Lysholm | 60/39.05 |
| 3,167,913 | 2/1965 | Muhlberg et al. | 60/39.53 |
| 930,564 | 8/1909 | Schmidt | 60/39.05 |
| 2,665,249 | 1/1954 | Zimmerman | 60/39.05 |
| 2,186,706 | 1/1940 | Martinka | 60/39.05 |
| 2,735,265 | 2/1956 | Eastman | 60/39.53 |

FOREIGN PATENTS OR APPLICATIONS

| | | | |
|---|---|---|---|
| 1,104,264 | 4/1961 | Germany | 60/39.05 |
| 695,838 | 8/1940 | Germany | 60/39.05 |
| 297,551 | 6/1954 | Switzerland | 60/39.05 |
| 1,239,888 | 12/1961 | Germany | 60/39.05 |
| 717,711 | 2/1942 | Germany | 60/39.53 |
| 836,714 | 6/1960 | Great Britain | 60/39.53 |

OTHER PUBLICATIONS

New Waste Disposal Process, Zimmerman, repr. from Chemical Engineering, Aug. 25, 1958, McGraw-Hill, New York, N.Y. pp. 117–120.

*Primary Examiner*—Carlton R. Croyle
*Assistant Examiner*—Warren Olsen
*Attorney*—Burgess, Dinklage & Sprung

[57] ABSTRACT

In a process of operating an open-cycle gas turbine plant supplied with gaseous fuels and combustion air, wherein the gas turbine is immediately supplied with the gases departing from the combustion chamber and the gaseous fuels and/or the combustion air are enriched with water vapor lowering the temperature of the gases departing from the combustion chamber, the improvement of sprinkling the flowing gaseous fuel and/or the combustion air immediately before entering the combustion chamber with circulating water which has been heated with waste heat thus saturating the fuel and/or combustion air with steam. The pressure of the circulating water is equal to the pressure of the fuel or of the combustion air and the temperature of the circulating water is lower than the boiling temperature under the pressure of the circulating water.

9 Claims, 3 Drawing Figures

Patented May 8, 1973

3,731,485

3 Sheets-Sheet 1

Inventors
PAUL RUDOLPH
ERNST KAPP
BY
BURGESS, DINKLAGE & SPRUNG
ATTORNEYS.

OPEN-CYCLE GAS TURBINE PLANT

BACKGROUND

This invention relates to a process of operating an open-cycle gas turbine plant supplied with gaseous fuels and combustion air, in which the gas turbine is immediately supplied with the gases departing from the combustion chamber and in which the gaseous fuels and/or the combustion air are enriched with water vapor for lowering the temperature of the gases departing from the combustion chamber.

In open-cycle gas turbine plants, the combustion gas cannot be processed directly in a gas turbine because the combustion temperatures are generally much higher than the upper limit of the turbine inlet temperature. That upper limit will depend on the heat resistance of the materials. To cool the combustion gases to a temperature which is permissible at the turbine inlet, heat is extracted from the gases in a boiler disposed between the combustion chamber and the gas turbine or colder fluids are admixed to the combustion gas or to the combustion reactants. The admixed fluid consists mainly of air or of an exhaust gas or steam. It is desired substantially to preheat the fluid to be admixed so that low-temperature heat can be returned into the cycle and more fluid must be admixed to obtain a given temperature drop in the combustion gases. Both effects promote the thermal efficiency.

All or part of the waste heat of the gas turbine process is available for preheating. The exhaust gases leave the turbine at a temperature which is much higher than the ambient temperature. The thermal efficiency of a plant will increase with the temperature drop imposed on the exhaust gases by cooling. Hence, the fluid which is admixed to the combustion gases or combustion reactants should be used to lower temperature of the exhaust gases as far as possible.

That object cannot be accomplished by heat transfer from the exhaust gas to the air because a high temperature rise is imparted to the air by the compression which is required. Furthermore, the air to be admixed should not be used to cool the exhaust gases before the air is compressed. This practice is uneconomical because too much power would then be required to compress the air so that the useful power of the gas turbine plane would be reduced.

The same remark is applicable to an admixing of exhaust gas. As the combustion is normally carried out in a single stage or possibly in two stages, a large portion of the exhaust gas would have to be compressed to a suitable pressure before entering the combustion chamber. The use of exhaust gas in this form is not economical. It has been proposed, however, to carry out the combustion in several stages, to effect only a partial expansion in each stage and to use the exhaust gas from each preceding stage to reduce the temperature in the following stage. That process is rendered difficult by the need to provide a separate turbine for each stage. Whereas it would seem desirable to compress the fuel gas and combustion air also in several stages, the machine expenditure involved in such practice would increase the costs of the plant.

Hence, the only remaining way to accomplish the object set forth above is to admix steam. As in boiler plants, the pressure of the fluid in the liquid state is increased to the required value, which in this case is at least as high as the pressure in the combustion chamber. This pressure rise required less power than the compression of air. The pressure of the make-up water is increased to the required value and the water is then preheated and evaporated in the stream of the exhaust gases and subsequently admixed as steam to the fuel gases and/or the combustion air before the same enters the combustion chamber.

Regarding the utilization of water heat, that process has the disadvantage that the latent heat of vaporization must be transferred to the make-up water from the exhaust gas when the latter is at a temperature above the boiling temperature corresponding to the pressure existing in the make-up water system and that pressure must be at least as high as the pressure of the fuel and/or the pressure of the combustion air before admission to the combustion chamber. If the preheating of the water to the boiling temperature is disregarded, the stream of exhaust gas can be cooled only to a temperature which by the temperature difference required for the heat transfer exceeds the boiling temperature under the pressure of the fuel or of the combustion air. If said temperature difference is 20° C. and the pressure in the combustion chamber is 10 kilograms per square centimeter above atmospheric pressure, the stream of exhaust gas could not be cooled below 199° C.

SUMMARY

To avoid that disadvantage, it is proposed by the invention to sprinkle, immediately before entering the combustion chamber, the flowing gaseous fuel and/or the combustion air with circulating water which has been heated with waste heat and the fuel and/or combustion air are thus saturated with steam, the pressure of the circulating water being equal to the pressure of the fuel or of the combustion air and the temperature of the circulating water being lower than the boiling temperature under the pressure of the circulating water.

The advantage of this step will be immediately apparent if it is realized that the evaporation of the make-up water from the circulating water need not be carried out under the full pressure of the fuel or of the air but at that water vapor partial pressure which is required in the fuel or combustion air for the desired saturation.

THE DRAWING

FIG. 1 is a simplified flow scheme showing an open-cycle gas turbine plant according to the invention.

Figure 2:
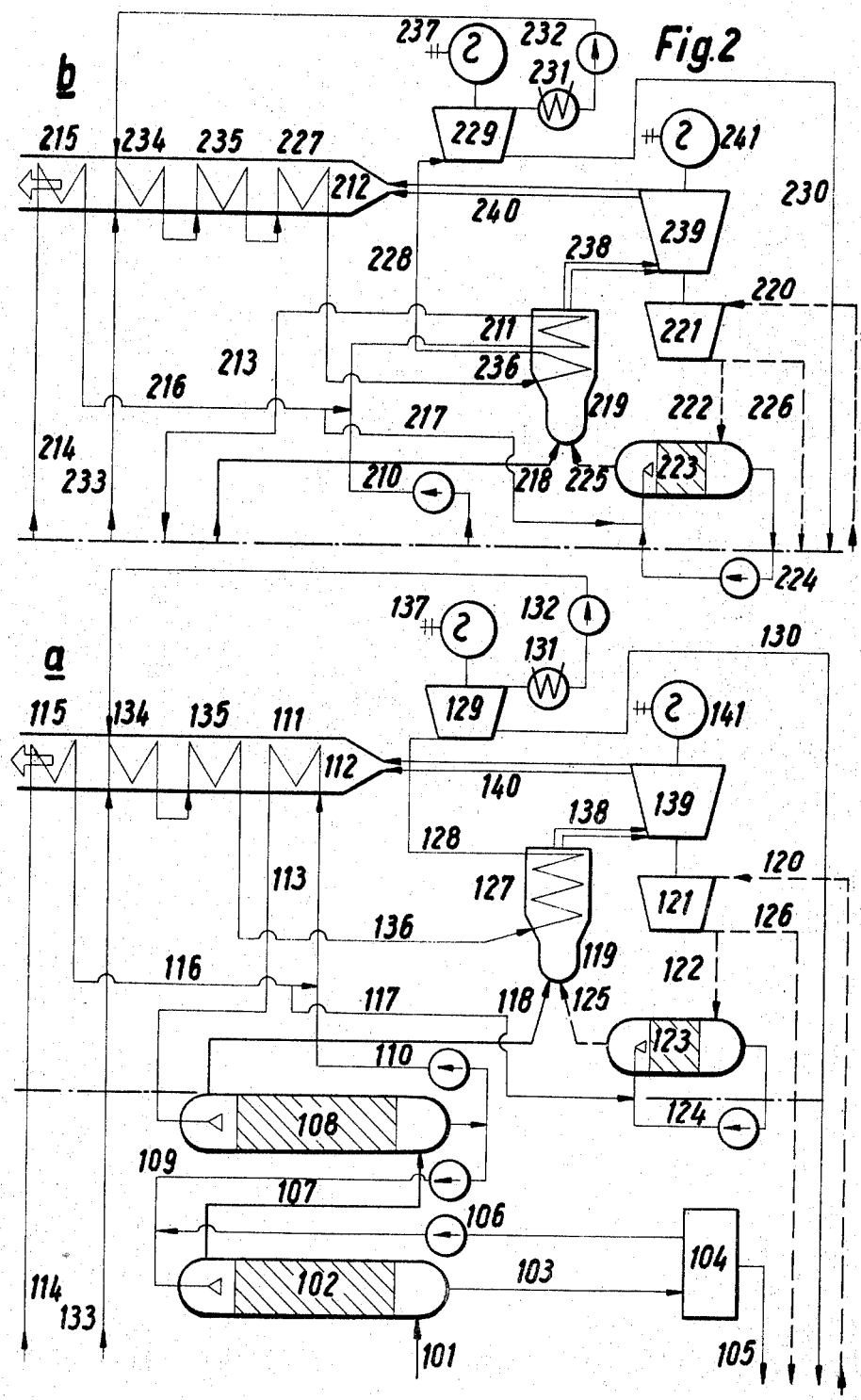

FIG. 2, *a* and *b*, is a flow scheme representing a combined gas turbine-steam turbine plant according to the invention in *a* with a steam boiler preceding the gas turbine and in *b* with a steam boiler succeeding the gas turbine.

Figure 3:
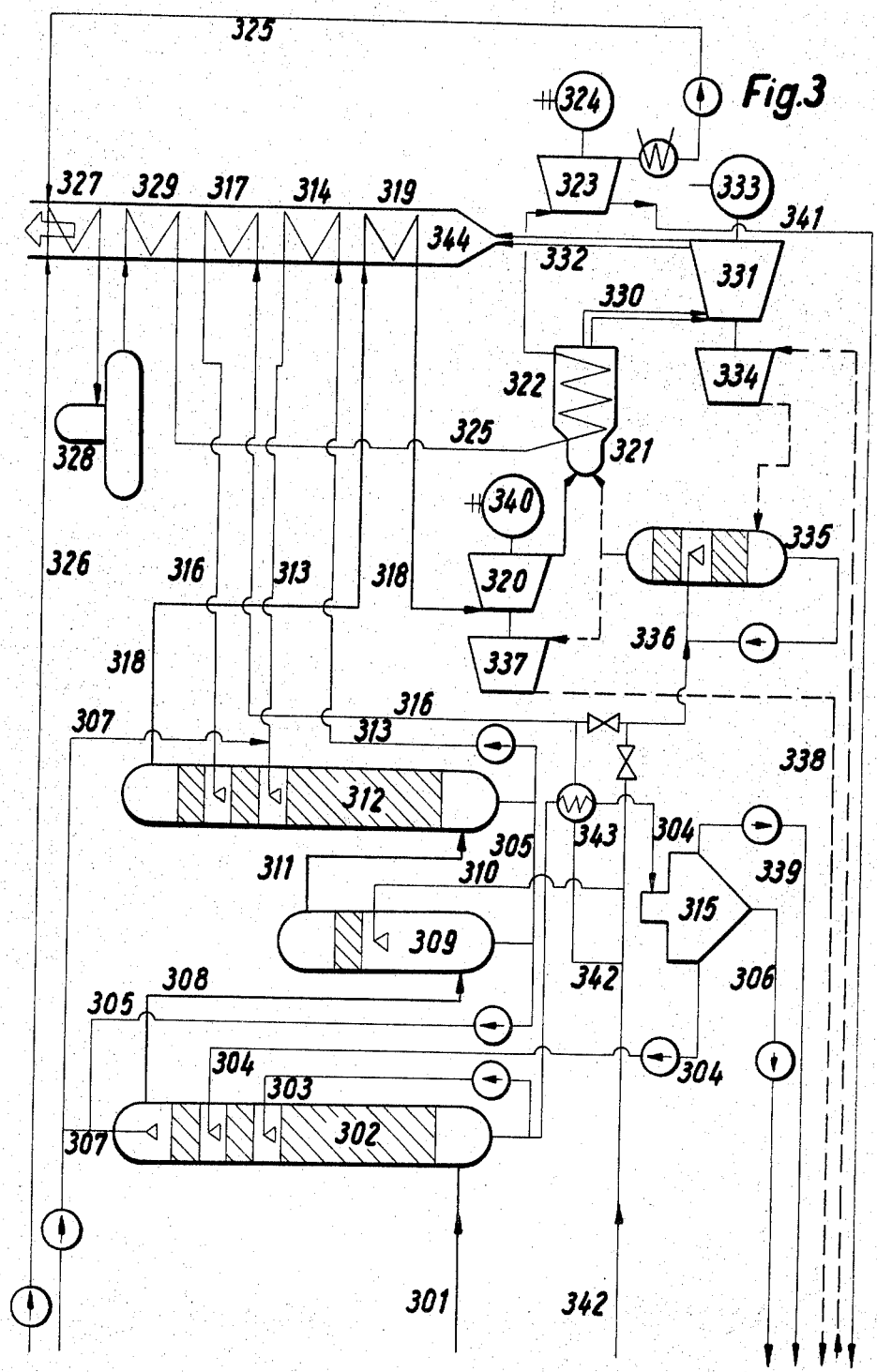

FIG. 3 is a flow scheme showing a preferred embodiment of a combined gas turbine-steam turbine plant with a preceding steam boiler in accordance with the invention.

DESCRIPTION

When it is assumed that the total pressure of the fuel or of the combustion air amounts to 10 kilograms per square centimeter absolute pressure and the water vapor partial pressure is 5 kilograms per square centimeter absolute pressure, the maximum temperature required for the circulating water would be 151° C. If the temperature difference required for the heat transfer from the stream of exhaust gas is again 20° C., as has been assumed above, the stream of exhaust gas could then be cooled down to 171° C. If the "normal" exhaust gas temperature at the exit of the gas turbine is 400° C., this additional cooling by 28° C. will increase the utilization of waste heat by about 14 percent. Just as in the process used for comparison, the preheating of the water to be admixed has not been taken into account.

It is particularly desirable to combine the proposed process with a wet purification, which is required with some gaseous fuels. The wet purification normally consists of an intense scrubbing, mainly with water, and necessarily results also in a saturation equilibrium, which depends on pressure and temperature, To improve the removal of dust by scrubbing, the temperature of the saturated gas is often lowered by a few degrees Centigrade. In that case, the solid particles form nuclei for the partial condensation of water vapor and are then drained with the condensate. Such wet purification may be combined with the enriching with water vapor according to the invention in one and the same sprinkler or trickling-cooler ( a cooler in which water trickles downwards over Raschig rings or similar devices in countercurrent to the gas), which is supplied with waste waters. Alternatively, the wet purification may precede the process according to the invention so that a gaseous fuel which has already been saturated is further enriched with water vapor in accordance with the invention. Obviously, this will be accompanied by a temperature rise of the gaseous fuel.

In an open gas turbine process using a fuel gas which has been produced by a gasification under pressure, a water-hydrocarbon mixture may be used for sprinkling according to the invention.

The addition of hydrocarbon results in an improved removal of any solids contained in the fuel gas.

Another advantage of the proposed process resides in that the make-up water need not meet any requirement as to purity. It is even possible to use waste waters which must be disposed of and the disposal of which may involve considerable expenses. Such waste waters contain in many cases evaporable organic constituents. In this way, additional waste energies can be utilized in an open-cycle gas turbine process.

The process may also be used in an open-cycle gas turbine plant which is combined with a steam turbine plant, regardless of whether the steam boiler precedes or succeeds the turbine. In the former case, the stream of exhaust gas contains unused waste heat. In the second case too, waste heat is left and can be utilized by circulating water to enrich the gas with water vapor because in the generation of steam in the steam boiler the stream of exhaust gas from the gas turbine cannot be cooled to such a low temperature as in the proposed process.

If a gas is available or produced which is under a pressure that is much higher than the pressure in the combustion chamber, the combustion chamber will be preceded by an expansion turbine. In that case, it is desired to enrich the gas with water vapor before entering the expansion turbine and possibly to superheat the gas before entering the turbine. The gas flowing from the expansion turbine to the combustion chamber may be saturated further at a lower temperature.

In accordance with the invention, the sprinkling water may be heated not only by the waste heat of the stream of exhaust gas but also by other waste heat available in the process. The stream of circulating water can be handled in a simpler manner and may be used, e.g., for interstage cooling in the air compressor.

The process according to the invention can be used to advantage in an open-cycle gas turbine plant which is supplied with a fuel gas obtained by a gasification under pressure. In this case, additional waste heat from the pressure gasification is available for heating. The pressure gasification plant includes, as a rule, a wet purification unit so that the wet purification and subsequent additional enriching with water vapor may be combined as has been described hereinbefore.

If the make-up water is heated and, if desired, feed water for the steam process is preheated, the use of waste heat at low temperatures in the proposed process enables a cooling of the stream of exhaust gas below the dew point so that even part of the latent heat of vaporization is recovered whereas it is lost otherwise.

A high saturation of the gas and of the air may highly reduce the inflammability of the mixture. In that case it is proposed to use an ignition or combustion catalyst in the combustion chamber preceding the gas turbine.

It has thus been shown that the proposed process enables an increase of the efficiency by a better utilization of the waste heat in a simple open-cycle gas turbine plant and in a combination thereof with a pressure gasification unit and/or a steam turbine plant. The application of the present process is not restricted to the examples mentioned here.

The process according to the invention can be used with success whenever the pressure of a hot waste fluid can be increased by circulating water which is under pressure whereas the evaporation need not be carried out under the full pressure.

In the system of FIG. 1, gas which has been produced, e.g., under pressure from fossil fuel flows in the system of FIG. 1 through conduit 1 into a scrubber 2, in which the gas is purified to remove impurities, particularly solids, and is saturated with water vapor to a state which depends on the pressure and temperature. Circulating water, which may contain condensible hydrocarbons, is supplied through a conduit 3 to a separator 4, in which the solids or a solids-hydrocarbon mixture are or is removed and returned through conduit 5 to the gasification process. The water is returned to the scrubber 2 through conduit 6, which incorporates a circulating pump.

The gas flows through conduit 7 into a saturator 8, in which it is enriched with water vapor. A partial stream is branched from the water which is drained from the saturator and said partial stream is supplied through a conduit 9 to the scrubber 2 in order to replace the water which has been evaporated in the scrubber suitable scrubbers and/or saturators are known in the art and are disclosed, for example, in U.S. Pat. No. 2,186,706 of Jan. 9, 1940.

The water cycle system for the saturator 8 includes a conduit 10, a heater 11 disposed in the exhaust gas duct 12, a conduit 13, a re-heater 14 in the stream of flue gases flowing to the turbine, and a conduit 15. The saturation cycle system and an air saturation cycle system, which will be described hereinafter, are supplied with water at the required rate through a conduit 16 and a preheater 17 disposed in the exhaust gas duct 12.

The saturated gas flows through a conduit 18 to a combustion chamber 19, in which it is mixed with air and burnt with the aid of an ignition catalyst. Combustion air is sucked by an air compressor 21 through conduit 20 and when compressed in the compressor is supplied through conduit 22 into a saturator 23, which serves to enrich the air with water and is included for this purpose in a water cycle system including a conduit 24, a heater 25 in the exhaust gas duct 12, and a conduit 26. The saturated air flows through a conduit 27 into the combustion chamber 19. A partial stream is conducted through conduit 28, heater 29 and conduit 30 for use as a gasifying agent in the production of the gas.

The hot flue gas produced by the combustion delivers heat in a superheater 29 and the water reheater 14 and flows through conduit 32 into a gas turbine 31, where it is expanded to perform work. The exhaust gases are supplied through conduit 34 into the exhaust gas duct 12, in which the heat exchangers 25, 11 and 17 are disposed so that a large portion of the waste heat is utilized for the saturation of gas and air. The turbine 31 drives the compressor 21 as well as an electric generator 33.

When purified gas under pressure is available, such as natural gas or compressed coke over gas, parts 1–6 and 9 will be omitted and the gas will enter the saturator through conduit 7. Parts 28–30 are also omitted because a gasifying agent is not required.

In a of FIG. 2, the first part as far as to a saturator 108 corresponds exactly to the description of FIG. 1. The saturator 108 is included in a water cycle system which comprises a conduit 110, a water heater 111 is an exhaust gas duct 112, and a conduit 113. Make-up water is supplied through conduit 114 and preheater 115 and flows through a conduit 116 to the cycle system which includes the saturator 108 and through a conduit 117 to an air saturation cycle system.

The gas flows through a conduit 118 to a burner 119. The air flows through conduit 120, compressor 121, conduit 122, saturator 123 included in cycle system 124, and conduit 125 to the burner 119. A partial stream of the air is conducted through conduit 126 for use as a gasifying air.

The burner 119 is directly succeeded by a forced-draft steam boiler 127 for producing superheated steam, which flows through conduit 128 to a steam turbine 129. Steam is bled from the turbine 129 and supplied through conduit 130 for use as a gasifying agent and to condenser 131. The condensed steam is conducted through conduit 132 and after receiving fresh feed water through conduit 133 is supplied through preheater 134, heater 135 and conduit 136 to the boiler 127. The steam turbine 129 drives an electric generator 137.

When heat has been extracted in the boiler 127 from the flue gas produced by the burner 119, said flue gas is supplied through conduit 138 to a gas turbine 139, where the gas is expanded to perform work. Through conduit 140, the exhaust gas enters an exhaust gas duct 112, which contains heat exchangers 111, 135, 134 and 115 for a utilization of waste heat. The gas turbine 139 drives the air compressor 121 and an electric generator 141.

The description of FIG. 2 differs from the foregoing description only in the following respects:

A steam boiler 227 is contained in an exhaust gas duct 212. A burner 219 is directly succeeded by a water heater 211 and by a superheater 236, which belongs to a steam boiler 227.

In FIG. 3, gas is produced under elevated pressure from fossil fuel and at a temperature above the saturation point enters through conduit 301 a scrubber 302, in which the gas is scrubbed and at the same time is saturated with the aid of the waste heat of the gasification process.

The scrubber is divided into a course scrubbing section, which is provided with a pressurized water cycle system 303, a re-saturator provided with a water cycle system 304, in which the water is subjected to a pressure relief, passed through a gravity separator 315 and re-pressurized before entering the re-saturator, and a re-scrubbing section, to which make-up water is supplied through conduit 305.

A scrubber which succeeds a counterflow coal gasification unit will also remove hydrocarbons, such as tar and oil, which preferentially retain dust so that a dust-hydrocarbon mixture can be removed from the separator 315 and returned to the gas producer by a conduit 306. If the scrubber succeeds a unit in which oil is gasified or coal is gasified in a uniflow process or fluidized bed, the hydrocarbons which are desired in the scrubbing process may be added through conduit 307.

The saturated gas flows through a conduit 308 into a mist producer and separator 309, in which cold water is injected through conduit 310 to produce a mist for removing the remaining solids. The gas is then supplied through conduit 311 into a saturator 312, which comprises a main saturating section provided with a pressurized water cycle system 313 including a re-heater 314 disposed in the stream of exhaust gas 344; a re-scrubbing section, which is supplied through conduit 316 with water which has been preheated in a heater 317 disposed in the stream of exhaust gas, and a mist collector.

Hydrocarbons may be added to the main cycle system 313 through conduit 307. Where coal is gasified in a counterflow process, these hydrocarbons may comprise surplus clear tar or oil produced in the process itself.

The gas is then discharged through a conduit 318 and is superheated in a heat exchanger 319 with hot exhaust gas and subsequently supplied to an expansion turbine 320, in which the gas is expanded with generation of energy to the pressure in a combustion chamber 321. The gas exiting from the expansion turbine, 320, can be enriched with water vapor.

The combustion chamber is directly succeeded by a steam boiler 322, in which superheated steam is produced, which performs work in a steam turbine-condenser unit 323 to drive an electric generator 324.

The cold condensed steam flows through a conduit 325, receives make-up feed water through conduit 326, and is heated in a preheater 327, which is disposed in the stream of exhaust gas, then degasified in a degasifier 328, preheated in a heater 329 and then returned to the steam boiler.

The flue gas leaves the steam boiler at a permissible temperature and flows through conduit 330 into a gas turbine 331, in which it is expanded to perform work. The exhaust gas flows through conduit 332 into an exhaust gas duct 344, in which it delivers its sensible heat before being discharged into the atmosphere.

The gas turbine 331 drives an electric generator 333 and an air compressor 334, which compresses the air to the pressure in the combustion chamber. In a saturator 335, part of the sensible heat which is due to the compression is used to saturate the air. Cold or warm water is supplied to the saturator 335 through a conduit 336. Part of the saturated steam flows into the combustion chamber 321. Another part is re-compressed in a compressor 337 and then supplied to the gasifier through a conduit 338. The re-compressor 337 is driven by the expansion turbine 320, which drives also an electric generator 340. Water which has been collected as completely as possible is supplied at a low rate from the separator 315 through a conduit 339 as an effluent, in which chlorine compounds and other well soluble constituents, which are deleterious in most cases, are discarded in a high concentration. The make-up water supplied through a conduit 342 to the saturators is partly conducted through a heat exchanger 343, in which the water withdrawn through conduit 304 of the second cycle system for the scrubber 302 is cooled to about 100° C.

The preheated make-up water is supplied to the re-scrubbing section of the saturator 312 and possibly to the saturator 335 for the combustion air. The remaining make-up water, which is cold, is supplied through a conduit 310 to the mist producer and collector 309 and possibly to the saturator 335.

Example 1 – Electric power generation from coal

One metric ton of long-flaming gas coal containing 7.5 percent moisture and 14.5 percent ash and having a net calorific value of 5850 kilocalories per kilogram is gasified in a counterflow process with 1440 standard cubic meters of air and a total amount of 0.707 metric ton of steam under a pressure of 20 kilograms per square centimeter absolute pressure to produce 2840 standard cubic meters of gas having the following analysis:

| | |
|---|---|
| $CO_2$ | 14.0% |
| $C_nH_m$ | 0.2% |
| $CO$ | 15.8% |
| $H_2$ | 25.0% |
| $CH_2$ | 5.0% |
| $N_2$ | 40.0% |

The gas also contains 0.142 kilograms water vapor and about 30 grams dry-distillation products per standard cubic meter and is discharged at an outlet temperature of 550° C.

Coal gasification per se is described by Winnacker et al in *Chemische Technologie*, Volume 3, Pages 165 and 166 (Munich 1959).

This gas is first scrubbed in the scrubber 302 with condensate produced in the process itself and with make-up water. The heat which is due to the superheating of the tar- and dust-laden gas is utilized in this step, in which a saturation temperature of 162° C. is reached. Cool make-up water is then injected into the separator 309 to cool the gas to 161° C. so that mist is formed, with which the last traces of dust are removed from the gas.

The gas is saturated thereafter in the saturator 312 by means of recirculated water, which is heated with waste heat from the flue gases behind the gas turbine. The saturation step is succeeded by a re-scrubbing step and re-saturation step to remove any remaining deleterious substances, such as chlorine compounds, vanadium, and sodium with the aid of clean make-up water which has been heated by heat from the condensed gas and from the turbine exhaust gases. The gas then has a saturation temperature of 165° C. and a water vapor content of 0.5 kilogram per standard cubic meter and is under a pressure of 19.5 kilograms per square centimeter absolute pressure.

Because the dry-distillation products formed in a counterflow gasification process enter the gas, the temperature drop in the scrubber results in a condensation of higher hydrocarbons, which have a strong scrubbing action on the entrained dust. When the scrubbing liquid has been removed and has been pressure-relieved in part, separate layers are formed by the hydrocarbons and water in the separator 315. The dust-laden hydrocarbons and the water are then pumped back into the gas producer and the scrubbing cycle system, respectively.

A small part of the water must be discarded to remove chlorine compounds and other components which are well soluble.

The saturated gas is heated in the heat exchanger 319 to 220° C. with waste heat from the flue gases and is subsequently expanded in an expansion turbine 320 to 12 kilograms per square centimeter absolute pressure. The turbine drives a re-compressor 337, in which the gasifying air is compressed from 12 to 23 kilograms per square centimeter absolute pressure, as well as an electric generator 340, which produces electrical energy amounting to 55 kilowatt-hours.

7320 standard cubic meters of air are compressed in the air compressor 334 to 12.5 kilograms per square centimeter absolute pressure and are saturated by being sprinkled with water in the air saturator 335 so that the air contains 0.104 kilograms water vapor per standard cubic meter and has a temperature of 108° C.

When the gasifying air has been delivered, 5880 standard cubic meters of air are left to support the combustion of the gas from the expansion turbine. The combustion is carried out in the combustion chamber 321, which is succeeded by a steam boiler 322, in which the flue gas is cooled to 800° C. before it enters the gas turbine. The flue gas, inclusive of steam, amounts to 10,660 standard cubic meters. In the turbine 331, the gas is expanded with a temperature drop to 400° C. to perform work. At the same time, the pressure is reduced to the atmospheric pressure. The energy delivered to the shaft of the turbine amounts to 1780 kWh. The air compressor consumes 820 kWh. 925 kWh of electrical energy are produced from the balance.

5.4 metric tons of steam under a pressure of 110 kilograms per square centimeter absolute pressure and at 520° C. are produced in the boiler 322 and are expanded in the steam turbine 323 initially to 24 kilograms per square centimeter absolute pressure, whereafter the gasifying steam is withdrawn and the remaining steam is expanded further and condensed. A small amount of steam for stripping the feed water in the degasifier is withdrawn at a pressure of 3 kilograms per square centimeter absolute pressure. The generator 324 driven by the steam turbine generates electrical energy amounting to 1550 kWh. Hence, the total electrical energy production amounts to 2530 kWh.

The make-up water is supplied at 20° C., as is shown in the drawing. Its amount is determined as follows:

| | | |
|---|---|---|
| Waste water | 0.062 | metric ton |
| Evaporation into gas | 1.017 | metric tons |
| Evaporation into air, in addition to the moisture content of the air | 0.724 | metric ton |
| | 1.803 | metric tons |

In the heat exchanger 343, 0.36 metric ton of make-up water is used to cool the water, which is to be pressure-relived. When re-heated in the fresh water heater 317, this make-up water is used for re-scrubbing in the saturator 312. The remainder is supplied in a cold state. The following heat quantities are transferred in succession in the flue gas duct 344 succeeding the gas turbine 331:

| | | |
|---|---|---|
| In gas heater 319 | 87,500 | kilocalories |
| in circulated water heater 314 | 142,000 | kilocalories |
| in fresh water heater 317 | 5,500 | kilocalories |
| in high-pressure feed water heater 329 | 774,000 | kilocalories |
| in feed water preheater 327 | 464,000 | kilocalories |
| | 1,473,000 | kilocalories |

Of that heat quantity, 251,000 kilocalories are extracted below the saturation point, which lies at 71° C., by a condensation of water vapor from the flue gas.

If the make-up water supplied in a cold state were also heated in the flue gas duct, additional 67,000 kilocalories could be utilized from the heat of condensation.

The gasifying air compressed to 23 kilograms per square centimeter absolute pressure contains 0.150 metric ton of steam, the steam from the water jacket

| | | |
|---|---|---|
| of the gas producers amounts to | 0.193 | metric ton |
| and the live steam from the steam turbine to | 0.364 | metric ton |
| | 0.707 | metric ton of steam |

The amount of feed water to be added is calculated as follows:

| | | |
|---|---|---|
| Gas producer jacket | 0.193 | metric ton |
| Live steam for gasification | 0.364 | metric ton |
| Loss in water vapor cycle | 0.118 | metric ton |
| Fresh feed water | 0.675 | metric ton |

The calorific value of the coal is related to the electrical energy generated therefrom as follows:

$[(5850 \times 1000)/2530] = 2310$ kilocalories per kWh if the very small power requirement of the pumps is disregarded Example 2 – Generation of electric power from heavy oil This example has been calculated like Example 1, with the following alterations:

In view of the very high gasification temperatures it is desired to pass the gas through a waste heat boiler for a generation of high-pressure steam before the gas is scrubbed and saturated. In this case, the air has not been saturated and it has been assumed that air is used which has the same moisture content as atmospheric air. The gasifying air must be cooled by a transfer of heat to the water cycle systems before it is compressed further. In view of the water vapor content, these measures result in a very low calorific value so that a combustion catalyst is suitably provided in the combustion chamber.

One metric ton of heavy oil having a net calorific value of 9800 kilocalories per kilogram is gasified with 4650 standard cubic meters of air, which contain 0.1 metric ton of water vapor, under a pressure of 21 kilograms per square centimeter absolute pressure. This gasification results in 6250 standard cubic meters of gas having the following analysis:

| | | |
|---|---|---|
| $CO_2$ | 2.0% | by volume |
| CO | 22.4% | by volume |
| $H_2$ | 16.2% | by volume |
| $CH_4$ | 0.1% | by volume |
| $N_2$ | 58.9% | by volume |
| $H_2S$ | 0.4% | by volume |
| | 100.0% | by volume |

The gas contains 0.043 kilogram water vapor per kilogram of dry gas. 0.021 metric ton of soot are formed and are entrained by the gas. 3.85 metric tons of saturated steam under a pressure of 120 kilograms per square centimeter absolute pressure are produced in the waste heat boiler. 0.15 metric ton of that steam is used to heat the heavy oil. The gas leaving the waste heat boiler has a temperature of 330° C.

This gas is scrubbed first in the scrubber 302 so that its saturation temperature is 134° C. In the separator 309, cold water is sprayed into the gas to cool it to 132° C. The resulting mist serves to remove the remaining soot. The gas is then saturated in the saturator 312 by recirculated liquid, which is heated in the heat exchanger 314 with waste heat from the flue gas exhausted from the turbine. The gas is then re-scrubbed with the fresh make-up and leaves the saturator with a saturation temperature of 159° C. so that the gas leaving the saturator has a saturation temperature of 159° C., contains 0.393 kilogram water vapor per standard cubic meter, and is under a pressure of 19.5 kilograms per square centimeter absolute pressure.

To improve the removal of soot by scrubbing, 400 kilograms of the heavy oil to be gasified are added to the water cycle systems. 100 kilograms of said oil are added to the saturator cycle. This oil together with the surplus water enters the scrubber 302, where the remaining 300 kilograms of oil are directly added. After part of the recirculated scrubbing liquid has been pressure-relieved, these 400 kilograms oil are separated from the water in the separator 315 and together with the soot contained in the oil and the remaining 600 kilograms heavy oil are supplied to the gasifier. The separated water, which is free of soot, is pumped back to the scrubber 302, except for a small part, which must be discarded to remove the soluble components, such as sodium compounds and vanadium compounds.

A tool of 2.21 metric tons of make-up water is required. 0.32 metric ton of make-up water is sprayed into the separator 309. 1.89 metric tons of make-up water are heated with waste heat transferred in the heat exchanger 343 from the discharged water-oil-soot mixture and with waste heat from the gasifying air flowing between the centrifugal compressors 334 and 337 (not shown in FIG. 3) and are then supplied to the saturator 312.

When the gas has been heated in the heat exchanger 319 with waste heat from the exhaust gas, the gas is expanded in the expansion turbine 320 to 12 kilograms per square centimeter absolute pressure. The turbine drives the re-compressor 337 and the electric generator 340. 40 kWh of electrical energy are produced from the net power.

13,050 standard cubic meters of air are compressed to 12 kilograms per square centimeter absolute pressure in the air compressor 334. Of that compressed air, 4650 standard cubic meters are further compressed for use as gasifying air and 8400 standard cubic meters serve to support the combustion of the gas in the combustion chamber 321.

The temperature of the flue gases is lowered to 800° C. in the steam boiler 322 before they enter the gas turbine 331, in which the gases are expanded with a temperature drop to 400° C. The turbine 331 drives the air compressor 334 and the electric generator 333. 1470 kWh of electrical energy are generated from the net power.

4.4 metric tons of steam are produced in the boiler 322 and together with the 317 metric tons of surplus steam from the waste heat boiler succeeding the gasifier are superheated so that square centimeter absolute pressure and at 520° C. enter the steam turbine 323. The latter drives the electric generator 324 to generate 2520 kWh of electrical energy. The feed water for the generation of steam is heated in the heat exchangers 327 and 329 in the flue gas stream. Heat at a temperature below the dew point of 66° C. is utilized for this purpose.

The total generation of electrical energy amounting to 4030 kWh, the specific heat consumption is 9800 × 1000 : 4030 kilocalories per kWh or 2430 kilocalories per kWh.

What is claimed is:

1. In a process of operating an open-cycle gas turbine plant including a combustion chamber to produce flue gases which are fed to the turbine, said combustion chamber being supplied with gaseous fuel and combustion air enriched with water, heat exchange means and water feeding means, the improvement which comprises:
    a. in a first stage, sprinkling said gaseous fuel with circulating water saturating and scrubbing said gaseous fuel with water vapor; and
    b. in a second stage, sprinkling said gaseous fuel from the first stage with circulating water which has been heated with waste heat thus heating the fuel and saturating it with steam immediately before entering the combustion chamber.
2. Process of claim 1 wherein water for said first stage is withdrawn from the circulating water of said second stage and the circulating water of the second stage is provided with make-up water.
3. Process of claim 1 wherein after the first stage the fuel is cooled and the resulting condensate is fed into the circulating water of the first stage.
4. Process of claim 1 wherein the waste heat of exhaust gas behind the gas turbine is utilized to heat the sprinkling water for the second stage.
5. Process of claim 1 wherein said gaseous fuel is produced by gasification under pressure and the waste heat from the gasification process is utilized as the waste heat in said second stage.
6. Process of claim 1 wherein said sprinkling is carried out with water containing soluble organic constituents or a mixture of water and oil or tar.
7. Process of claim 1 wherein said open cycle gas turbine plant is operated in combination with a steam turbine plant.
8. Process of claim 1 wherein an expansion turbine precedes said combustion chamber.
9. Process of claim 1 wherein the turbine exhaust gases are cooled below their dew point by the water used for said sprinkling.

* * * * *

UNITED STATES PATENT OFFICE
CERTIFICATE OF CORRECTION

Patent No. 3,731,485   Dated May 8, 1973

Inventor(s) PAUL RUDOLPH, ET. AL.

It is certified that error appears in the above-identified patent and that said Letters Patent are hereby corrected as shown below:

On the cover sheet [30], "P 20 05 656.1" should read -- P 20 05 656.8-13 -- . On the cover sheet under "Other Publications", "117-120" should read -- 118-20 -- . Column 6, line 6, "Fig. 2" should read -- Fig. 2b -- . Column 8, line 55, "The" should read -- This -- . Column 9, lines 21, 36, 52 and 60, in each instance a horizontal line should be inserted before the total of the figures. Column 10, line 30, a horizontal line should be inserted before the total figure.

Signed and sealed this 20th day of November 1973.

(SEAL)
Attest:

EDWARD M. FLETCHER, JR.
Attesting Officer

RENE D. TEGTMEYER
Acting Commissioner of Patents